(12) United States Patent
Sinha et al.

(10) Patent No.: US 12,165,129 B2
(45) Date of Patent: Dec. 10, 2024

(54) METHOD AND SYSTEM FOR FACILITATING SECURE CARD-BASED TRANSACTIONS

(71) Applicant: Mastercard International Incorporated, New York, NY (US)

(72) Inventors: Ajay Sinha, Pune (IN); Naveen Kumar Gupta, Pune (IN); Jay Kulshreshtha, Mumbai (IN); Suraj Sah, Shyamnagar (IN); Kaushal Naveen Shetty, Thane West (IN)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 107 days.

(21) Appl. No.: 17/342,457

(22) Filed: Jun. 8, 2021

(65) Prior Publication Data

US 2021/0383358 A1    Dec. 9, 2021

(30) Foreign Application Priority Data

Jun. 9, 2020 (IN) .............................. 202021024186

(51) Int. Cl.
  *G06Q 20/34* (2012.01)
  *G06K 19/077* (2006.01)
(52) U.S. Cl.
  CPC ..... *G06Q 20/341* (2013.01); *G06K 19/07775* (2013.01); *G06Q 20/352* (2013.01)
(58) Field of Classification Search
  CPC .................................................... G06Q 20/341
  USPC ....................................................... 235/379
  See application file for complete search history.

(56) References Cited

U.S. PATENT DOCUMENTS

| 6,655,585 B2 | 12/2003 | Shinn |
| 9,355,236 B1 | 5/2016 | Kratz et al. |
| 2002/0095587 A1 | 7/2002 | Doyle et al. |
| 2012/0293166 A1* | 11/2012 | Lee ..................... G01D 5/2046 324/207.17 |
| 2013/0108125 A1 | 5/2013 | Storm et al. |
| 2013/0228616 A1 | 9/2013 | Bhosie et al. |

(Continued)

FOREIGN PATENT DOCUMENTS

EP    3376454 A    9/2018

OTHER PUBLICATIONS

Office Action from Intellectual Property India; IN 201911014086; Jan. 28, 2021.

(Continued)

*Primary Examiner* — Rafferty D Kelly
(74) *Attorney, Agent, or Firm* — Pramudji Law Group PLLC; Ari Pramudji

(57) ABSTRACT

A transaction card comprises a piezoelectric chip configured to detect an impact applied to at least a portion of the transaction card, and generate an electrical pulse signal based on the detected impact. A processing circuitry of the transaction card is coupled to the piezoelectric chip. The processing circuitry, upon powering on, is configured to enable data exchange between the transaction card and a terminal device for executing a card-based transaction at the terminal device. The data exchange is enabled only when a magnitude of the electrical pulse signal exceeds a threshold value, thereby preventing unwanted data transfer from the transaction card.

17 Claims, 10 Drawing Sheets

(56) References Cited

U.S. PATENT DOCUMENTS

| | | | |
|---|---|---|---|
| 2015/0073983 A1* | 3/2015 | Bartenstein | G06Q 20/325 |
| | | | 705/41 |
| 2015/0213351 A1 | 7/2015 | Wyatt | |
| 2016/0226837 A1 | 8/2016 | Kim | |
| 2017/0124445 A1 | 5/2017 | Howard | |
| 2017/0323166 A1* | 11/2017 | Colussi | G06K 19/07354 |
| 2019/0080326 A1 | 3/2019 | Trivedi et al. | |
| 2019/0188687 A1* | 6/2019 | Sandeløv | G07F 7/127 |

OTHER PUBLICATIONS

Henniger, et al.; Extending EMV Payment Smart Cards with Biometric On-Card Verification; 3rd Policies and Research in Identity Management (IDMAN); pp. 121-130; Apr. 2013.

* cited by examiner

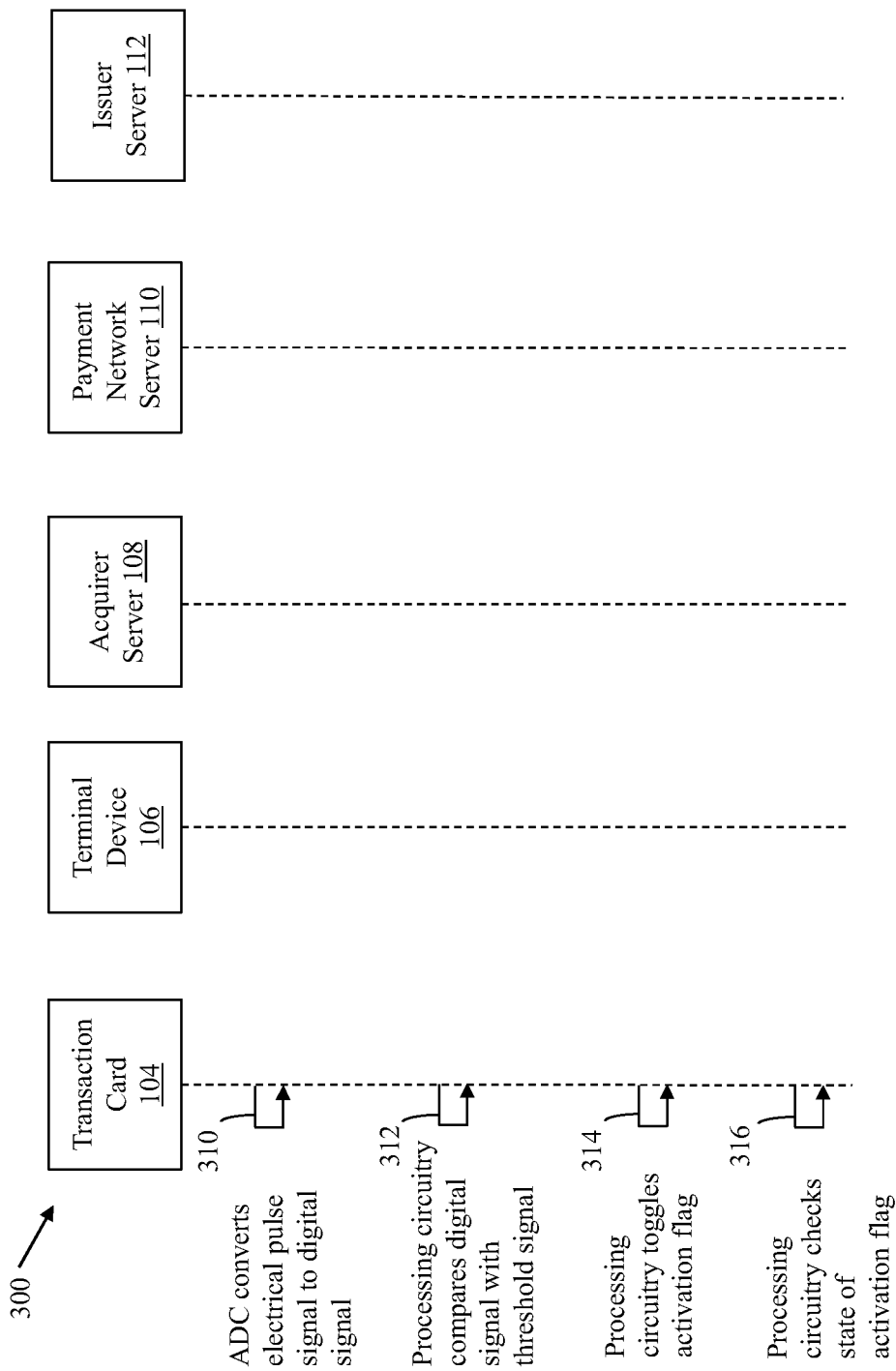

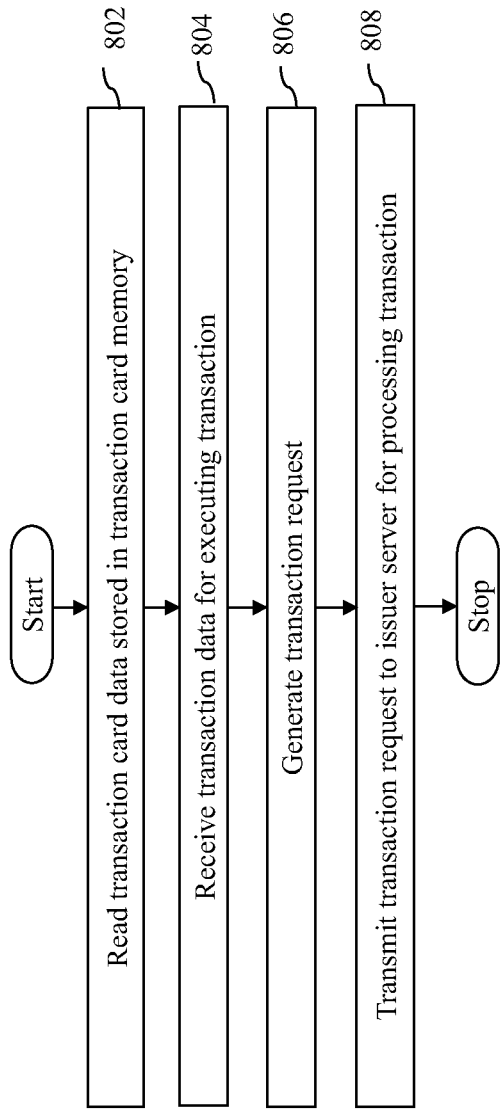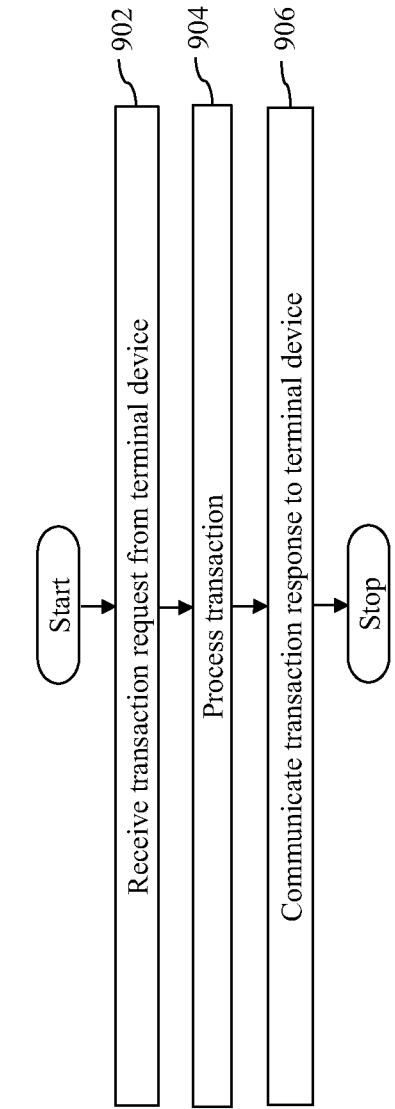

METHOD AND SYSTEM FOR FACILITATING SECURE CARD-BASED TRANSACTIONS

FIELD OF THE DISCLOSURE

Various embodiments of the disclosure relate generally to transaction systems. More particularly, various embodiments of the present disclosure relate to a transaction card, a method, and a system for facilitating secure card-based transactions.

DESCRIPTION OF THE RELATED ART

Introduction of transaction cards, such as credit cards and debit cards, has increased the ease with which users perform payment transactions. Examples of such transactions include cash deposits and withdrawals, credit transfers, purchase payments, and/or the like. In order to further improve transaction experience of cardholders, contactless transactions are made possible through these transaction cards by leveraging near field communication (NFC) technology.

A contactless transaction may be performed by a cardholder when a transaction card is present within a communication range of a terminal device such as an Automated Teller Machine (ATM), a Point-of-Sale (POS) device, a mobile POS (MPOS) device, a Point-of-Interaction (POI) device, a Point-of-Purchase (POP) device, or the like. The transaction card, when kept within the communication range of the terminal device, gets powered on and transaction card data that is stored on the transaction card is read by the terminal device in a contactless manner via NFC technology. In other words, data is exchanged between the transaction card and the terminal device in a contactless manner for executing the transaction.

Although the use of NFC technology for data exchange between the transaction card and the terminal device has reduced time and effort required for performing card-based (i.e., card-present) transactions, it has also increased the risk of exposing the sensitive transaction card data to a variety of potential threats. For example, due to the transaction card being NFC enabled, a perpetrator having a suitable card reader may fraudulently obtain the transaction card data from a considerable distance. For a cardholder, transaction card data is very sensitive and confidential information, compromise of which may lead to fraudulent transactions through the transaction card. Compromise of the transaction card data not only causes the cardholder to face financial loss and emotional despair, but also adversely affects other parties (such as an issuer, an acquirer, or a payment network interchange) involved in transaction processing. For example, the issuer, the acquirer, or the payment network interchange may have to bear additional costs for processing transaction disputes and replacing compromised transaction cards.

In light of the foregoing, there is a need for a technical solution that facilitates seamless contactless transactions while ensuring security of transaction card data.

SUMMARY

In an embodiment of the present disclosure, a transaction card for facilitating secure card-based transactions is provided. The transaction card comprises a piezoelectric chip and processing circuitry. The piezoelectric chip is configured to detect an impact applied to at least a portion of the transaction card and generate an electrical pulse signal based on the detected impact. The processing circuitry is coupled to the piezoelectric chip. Upon powering on, the processing circuitry is configured to enable data exchange between the transaction card and a terminal device for executing a card-based transaction at the terminal device when a magnitude of the electrical pulse signal exceeds a threshold value. The data exchange includes exchange of at least one of transaction card data of the transaction card or transaction data of the card-based transaction.

In another embodiment of the present disclosure, a method for facilitating secure card-based transactions is provided. The method includes, detecting, by a piezoelectric chip on a transaction card, an impact applied to at least a portion of the transaction card. An electrical pulse signal is generated by the piezoelectric chip based on the detected impact. For executing a card-based transaction at a terminal device, data exchange between the transaction card and the terminal device is enabled by processing circuitry of the transaction card. The data exchange is enabled when the processing circuitry is powered on and a magnitude of the electrical pulse signal exceeds a threshold value. The data exchange includes exchange of at least one of transaction card data of the transaction card or transaction data of the card-based transaction.

In another embodiment of the present disclosure, a system for facilitating secure card-based transactions is provided. The system comprises a transaction card and a terminal device. The transaction card comprises a piezoelectric chip and processing circuitry. The piezoelectric chip is configured to detect an impact applied to at least a portion of the transaction card and generate an electrical pulse signal based on the detected impact. The processing circuitry is coupled to the piezoelectric chip. Upon powering on, the processing circuitry is configured to enable data exchange for the transaction card when a magnitude of the electrical pulse signal exceeds a threshold value. The data exchange includes exchange of transaction card data of the transaction card. The terminal device is configured to receive the transaction card data from the transaction card when the data exchange is enabled, and generate a transaction request for the card-based transaction based on the transaction card data. The card-based transaction is processed based on the transaction request.

BRIEF DESCRIPTION OF DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIGS. 3A, 3B, and 3C, collectively represent a process flow diagram that illustrates an exemplary scenario for facilitating a secure card-based transaction at a terminal device of FIG. 1 using the transaction card of FIGS. 1 and 2, in accordance with an exemplary embodiment of the present disclosure;

FIG. 8 is a flowchart that illustrates a method for facilitating the secure card-based transaction at the terminal device of FIG. 1, in accordance with an exemplary embodiment of the present disclosure;

FIG. 9 is a flowchart that illustrates a method for facilitating the secure card-based transaction by the issuer server of FIG. 1, in accordance with an exemplary embodiment of the present disclosure.

Figure 1:
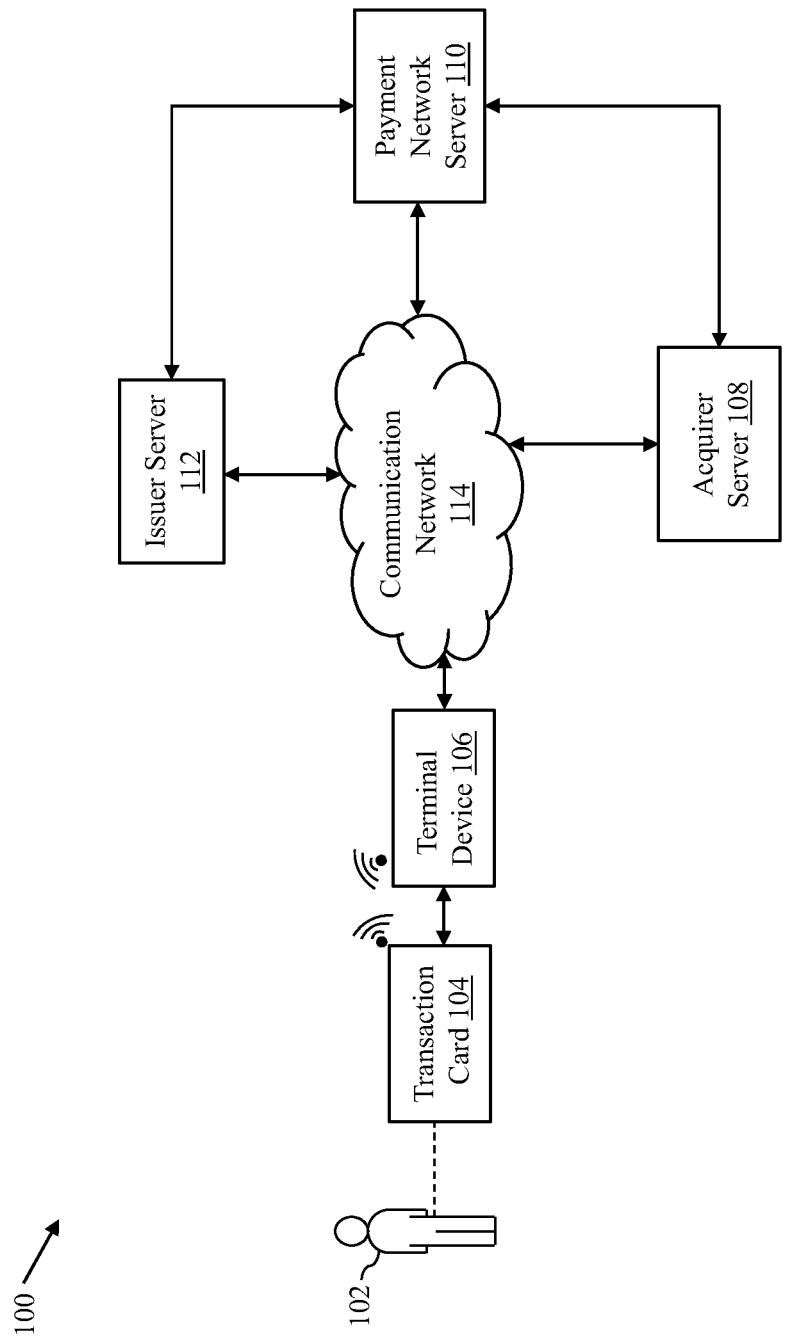
FIG. 1 is a block diagram that illustrates an exemplary environment for facilitating secure card-based transactions, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION OF EMBODIMENTS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

When a near field communication (NFC)-enabled transaction card is brought within a communication range of a terminal device, the transaction card gets powered on. The NFC-enabled transaction card, when powered on, is able to exchange transaction card data, stored therein, with the terminal device for executing a transaction. In other words, any device, having a capability of powering on the transaction card and reading the transaction card data, may read the transaction card data when present in vicinity of the transaction card. Such card reading devices may be used by perpetrators to fraudulently obtain the sensitive transaction card data. Hence, causing financial loss and distress to a cardholder of the transaction card and other transacting parties, which is undesirable.

Various embodiments of the present disclosure provide an NFC-enabled transaction card, a method, and a system that solves the abovementioned problem by providing security measures to prevent unwanted data transfer upon powering on of the transaction card. The transaction card includes processing circuitry, a transaction card memory, and a radio frequency (RF) interface. The transaction card further includes a piezoelectric chip comprising a piezoelectric crystal and an analog-to-digital convertor (ADC). For performing a contactless transaction at a terminal device, a cardholder of the transaction card brings the transaction card within an RF field (i.e., NFC range) of the terminal device. When brought within the RF field, the transaction card gets powered on due to an interaction between the RF field and the RF interface. Upon powering on, data exchange is initially disabled for the transaction card. For enabling the data exchange, the cardholder is required to provide an impact to the transaction card. When the cardholder provides an impact (e.g. by tapping, shaking, waving, or the like) to the transaction card, the piezoelectric crystal generates an electrical pulse signal and provides it to the ADC. The ADC converts the received electrical pulse signal to a digital signal. The processing circuitry receives the digital signal from the ADC and determines whether a magnitude of the digital signal exceeds a threshold value. When the magnitude of the digital signal exceeds the threshold value, the processing circuitry toggles a state of an activation flag, stored in the transaction card memory, from a reset state to a set state. Only when the activation flag is in the set state, the processing circuitry enables data exchange between the transaction card and the terminal device for the transaction. Based on the data exchange between the transaction card and the terminal device, the terminal device communicates a transaction request to an issuer server of the transaction card for processing the transaction.

Thus, data exchange is enabled for the transaction card only when the magnitude of the electrical pulse signal, generated due to the impact, is greater than the threshold value. Therefore, a malicious card reader, present in vicinity of the transaction card, is prevented from obtaining the transaction card data without the knowledge of the cardholder. Thus, the present disclosure provides a solution for facilitating contactless transactions while ensuring seamless and secure data exchange between the transaction card and the terminal device.

Terms Description (in Addition to Plain and Dictionary Meaning)

Transaction is an exchange of funds between two or more parties. For example, the transaction may include transferring a transaction amount from a user account to a merchant account, when a user makes a purchase from a merchant. In another example, the transaction may include dispensing cash, by an Automated Teller Machine (ATM), equivalent to a transaction amount debited from the user account of the user based on a request from the user. The transaction also includes an inquiry, or any other operation that is performed by using a transaction card at any terminal device.

Terminal device is an electronic device that enables a cardholder of a transaction card to perform a transaction using the transaction card. Examples of the terminal device include an ATM, a Point-of-Sale (POS) device, a mobile POS (MPOS) device, a Point-of-Interaction (POI) device, a Point-of-Purchase (POP) device, a bunch note acceptor, a currency recycler, or the like. The terminal device is NFC enabled to support contactless transactions using NFC-enabled transaction cards. The terminal device generates an RF field (e.g., an electromagnetic field) for communicating with the NFC-enabled transaction cards in a contactless manner. The terminal device may be associated with a server arrangement that is configured to process the transaction.

Contactless transaction refers to a card-based (i.e., card present) transaction performed at a terminal device without requiring any physical contact between a transaction card and the terminal device. For example, when a transaction card brought within an RF field of the terminal device, the transaction card is powered on and the terminal device reads transaction card data, required for executing the contactless transaction, from the transaction card. The terminal device reads the transaction card data in a contactless manner.

Transaction card refers to a physical payment device, such as a debit card, a credit card, a prepaid card, a promotional card, a contactless card, and/or any other device, that allows a cardholder to perform electronic transactions, such as deposits and withdrawals, credit transfers, purchase payments, and the like. The transaction card is issued to the cardholder by an issuer and is NFC enabled. The transaction card includes a transaction card memory, processing circuitry, an RF interface, and a piezoelectric chip. The piezoelectric chip of the transaction card includes a piezoelectric crystal and an ADC.

Transaction card memory is a data storage device on a transaction card that stores transaction card data (such as a card number, an expiry date, a name of a cardholder, a card verification value (CVV), or the like) of the transaction card. In one example, the transaction card memory may be a Europay, Mastercard and Visa (EMV) chip. Further, the transaction card memory is readable by a terminal device in a contact-based or a contactless manner for executing transactions.

Piezoelectric chip is a thin membrane structure that is formed on or attached to a transaction card. The piezoelectric chip performs various operations for enabling data exchange between the transaction card and a terminal device. For example, the piezoelectric chip generates an electrical pulse signal when an impact is applied to at least a portion of the transaction card. Based on a magnitude of the generated electrical pulse signal, data exchange is enabled (or activated) for the transaction card. In one example, when the magnitude of the generated electrical pulse signal is less than a threshold value, no data exchange is allowed between the transaction card and the terminal device. The piezoelectric chip includes a piezoelectric crystal and an ADC.

Piezoelectric crystal is a piezoelectric sensor that exhibits piezoelectric effect. In other words, the piezoelectric crystal, when subjected to an impact, produces an electric charge. Examples of piezoelectric crystal includes, but are not limited to, quartz, Topaz, Lead Zirconate Titanate, and Barium Titanate.

ADC is an electronic component that converts an electrical pulse signal to a digital signal. The ADC receives an analog input and generates a digital output (e.g., a square wave). Schmitt Trigger Circuit is an example of ADC.

Processing circuitry refers to electronic circuitry (e.g., conductive traces and a microcontroller) present on a transaction card. The processing circuitry is configured to determine a magnitude of one of an electrical pulse signal and a digital signal, and control a state of an activation flag stored in a transaction card memory of the transaction card. For example, the processing circuitry toggles the activation flag from a reset state to a set state when the magnitude of one of the electrical pulse signal and the digital signal exceeds a threshold value. The processing circuitry further manages data exchange between the transaction card and a terminal device based on the state of the activation flag. For example, the processing circuitry enables data exchange between the transaction card and the terminal device when the activation flag is SET.

RF interface refers to circuitry that is embedded on or attached to a surface of a transaction card to both power the transaction card as well as to exchange data with the terminal device. The RF interface gets charged when kept within an RF field of a terminal device and powers processing circuitry of the transaction card for carrying out a transaction at the terminal device.

Impact refers to a mechanical stress, a physical deformation, or kinetic energy that when applied to at least a portion of a transaction card, causes a piezoelectric crystal on the transaction card to generate an electrical pulse signal. A magnitude of the generated electrical pulse signal is based on a magnitude of the impact. Impact may be applied to the transaction card by tapping the transaction card, pressing the transaction card, waving the transaction card, shaking the transaction card, or the like.

Activation flag refers to a memory flag stored in a transaction card memory of a transaction card. The activation flag indicates a state of data exchange between the transaction card and a terminal device. For example, when the activation flag is SET (i.e., in a set state), data exchange between the transaction card and the terminal device is enabled and when the activation flag is RESET (i.e., in a reset state), data exchange between the transaction card and the terminal device is disabled. By default, the activation flag is in the reset state when the transaction card is powered on. Processing circuitry of the transaction card toggles the activation flag from the reset state to the set state to enable the data exchange between the transaction card and the terminal device. The activation flag is toggled from the reset state to the set state when a magnitude of an electrical pulse signal, generated due to an impact applied to the transaction card, exceeds a threshold value.

Issuer is a financial institution which establishes and maintains user accounts of several users. The issuer authorizes and processes transactions based on transaction card data of a transaction card and transaction data of a card-based transaction received in a transaction request.

Server arrangement is a physical or cloud-based data processing system on which a server program runs. The server arrangement may be implemented as hardware or software, or a combination thereof. The server arrangement may correspond to one of a payment network server, an issuer server, or an acquirer server. The server arrangement executes various programs required for processing a card-based transaction.

FIG. 1 is a block diagram that illustrates an exemplary environment 100 for facilitating secure card-based transactions, in accordance with an exemplary embodiment of the present disclosure. The environment 100 includes a cardholder 102, a transaction card 104, a terminal device 106, an acquirer server 108, a payment network server 110, and an issuer server 112. The terminal device 106, the acquirer server 108, the payment network server 110, and the issuer server 112 may communicate with each other by way of a communication network 114 or through separate communication networks established therebetween.

The cardholder 102 is an individual to whom the transaction card 104 is issued by an issuer. The cardholder 102 may use the transaction card 104 for initiating card-based (i.e., card-present) transactions at the terminal device 106. Hereinafter, the terms "transaction", "card-based transaction", and "card-present transaction" are used interchangeably. The transaction, as described herein, is a contactless transaction.

The transaction card 104 is a contactless payment card associated with a financial account of the cardholder 102. Examples of the transaction card 104 may include, but are not limited to, a debit card, a credit card, or a prepaid card. The transaction card 104 includes suitable logic, circuitry, interface, and/or code, executable by the circuitry, for initiating contactless transactions at the terminal device 106. The transaction card 104 stores therein transaction card data such as a card number, an expiry date, a name of the cardholder 102, a card verification value (CVV), or the like. The transaction card 104 is near-field communication (NFC) enabled and allows for conditional data exchange between the transaction card 104 and the terminal device 106 for contactless transactions. For example, contactless data exchange between the transaction card 104 and the terminal device 106 is initially disabled when the transaction card 104 is powered on. The data exchange between the transaction card 104 and the terminal device 106 is enabled only when an impact that satisfies a specific threshold criterion is applied to the transaction card 104. Various components of the transaction card 104 and their functionalities are described with respect to FIG. 2.

The terminal device 106 is an electronic device that includes suitable logic, circuitry, interface, and/or code, executable by the circuitry, for facilitating transactions initiated using the transaction card 104. In one example, the terminal device 106 may be a Point-of-Sale (POS) device associated with a merchant store. In such a scenario, the terminal device 106 allows the cardholder 102 to perform transactions using the transaction card 104 for purchasing products and/or services from the merchant store. In another example, the terminal device 106 may be an Automated Teller Machine (ATM) that allows the cardholder 102 to access banking services (e.g., cash withdrawals, cash deposits, balance inquiry, and the like) offered by the issuer server 112 or the acquirer server 108 associated with the terminal device 106. Other examples of the terminal device 106 may include, but are not limited to, a Point-of-Purchase (POP) device, a Point-of-Interaction (POI) device, a currency recycler, a bunch note acceptor, or the like. The terminal device 106 may communicate with the transaction card 104 in a contact-based or contactless manner.

Figure 4:
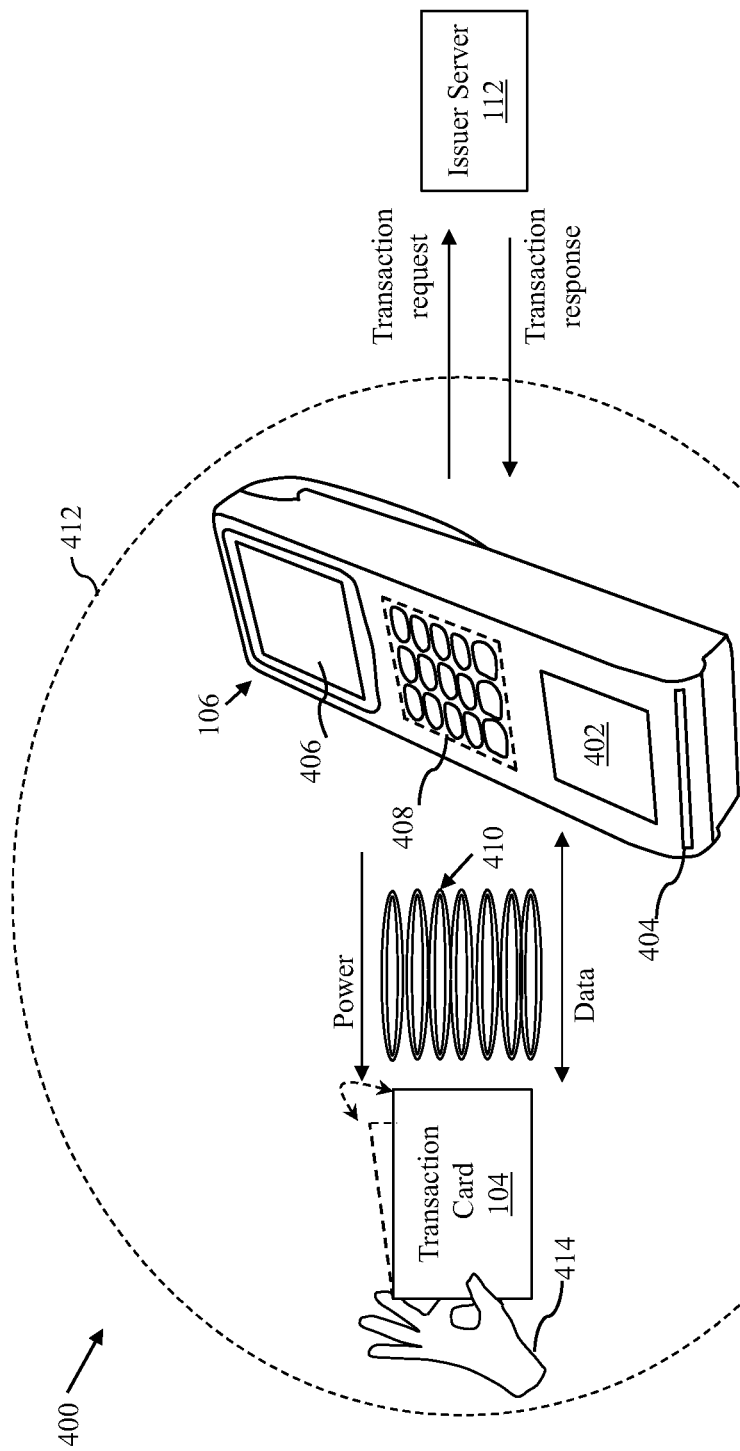
FIG. 4 is a schematic diagram that illustrates an exemplary scenario for conducting a card-based transaction at the terminal device of FIG. 1 using the transaction card of FIGS. 1 and 2, in accordance with an exemplary embodiment of the present disclosure.

For communicating with the transaction card 104 in a contactless manner, the terminal device 106 may generate a radio frequency (RF) field within a threshold distance (i.e., an NFC range) of the terminal device 106. The RF field of the terminal device 106 may be an area around the terminal device 106 that gets charged due to an electromagnetic effect caused by the terminal device 106. In one embodiment, the terminal device 106 may include an RF field generator (as depicted in FIG. 4) configured to generate the RF field (as depicted in FIG. 4) within the threshold distance of the terminal device 106. For example, the threshold distance may be 2 cm, 4 cm, 6 cm, 8 cm, 10 cm, or the like. The terminal device 106 may further include input buttons (as depicted in FIG. 4) and/or touch-enabled interface (as depicted in FIG. 4).

In another embodiment, the terminal device 106 may be a user device that is configured to read the transaction card data in contactless manner. Examples of the user device may include, but are not limited to, a laptop, a smartphone, a tablet, a phablet, and the like.

The acquirer server 108 is a server arrangement which includes suitable logic, circuitry, interface, and/or code, executable by the circuitry, for processing transactions initiated at the terminal device 106. The acquirer server 108 is operated by an acquirer associated with the terminal device 106. The acquirer server 108 further communicates with the payment network server 110 and the issuer server 112 for processing the transactions.

The payment network server 110 is a server arrangement which includes suitable logic, circuitry, interface, and/or code, executable by the circuitry, for processing transactions that are performed using the transaction card 104. The payment network server 110 is operated by a payment network (i.e., a payment interchange). The payment network server 110 represents an intermediate entity between the issuer server 112 and the acquirer server 108 for processing the transactions.

The issuer server 112 is a server arrangement which includes suitable logic, circuitry, interface, and/or code, executable by the circuitry, for processing various transactions. The issuer server 112 is operated by an issuer of the transaction card 104. The issuer may be a financial institution that manages one or more financial accounts of the cardholder 102 and other users. The issuer server 112 receives a transaction request for a transaction initiated at the terminal device 106 by way of the transaction card 104. The transaction request may include the transaction card data associated with the transaction card 104 and transaction data of the transaction. The issuer server 112 processes the transaction based on the transaction card data and the transaction data included in the transaction request. For example, the issuer server 112 may either approve or decline the transaction based on the transaction request. The issuer server 112 may further credit, debit and modify the financial account of the cardholder 102 based on the processing of the transaction. Methods for processing the transactions via the issuer server 112 will be apparent to persons having skill in the art and may include processing a transaction via the traditional four-party system or three-party system.

Examples of the acquirer server 108, the payment network server 110, and the issuer server 112 may include, but are not limited to, computers, laptops, mini-computers, mainframe computers, any non-transient and tangible machines that may execute a machine-readable code, cloud-based servers, distributed server networks, a network of computer systems, or a combination thereof.

The communication network 114 is a medium through which content and messages are transmitted between the terminal device 106, the acquirer server 108, the payment network server 110, and/or the issuer server 112. Examples of the communication network 114 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a RF network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2:
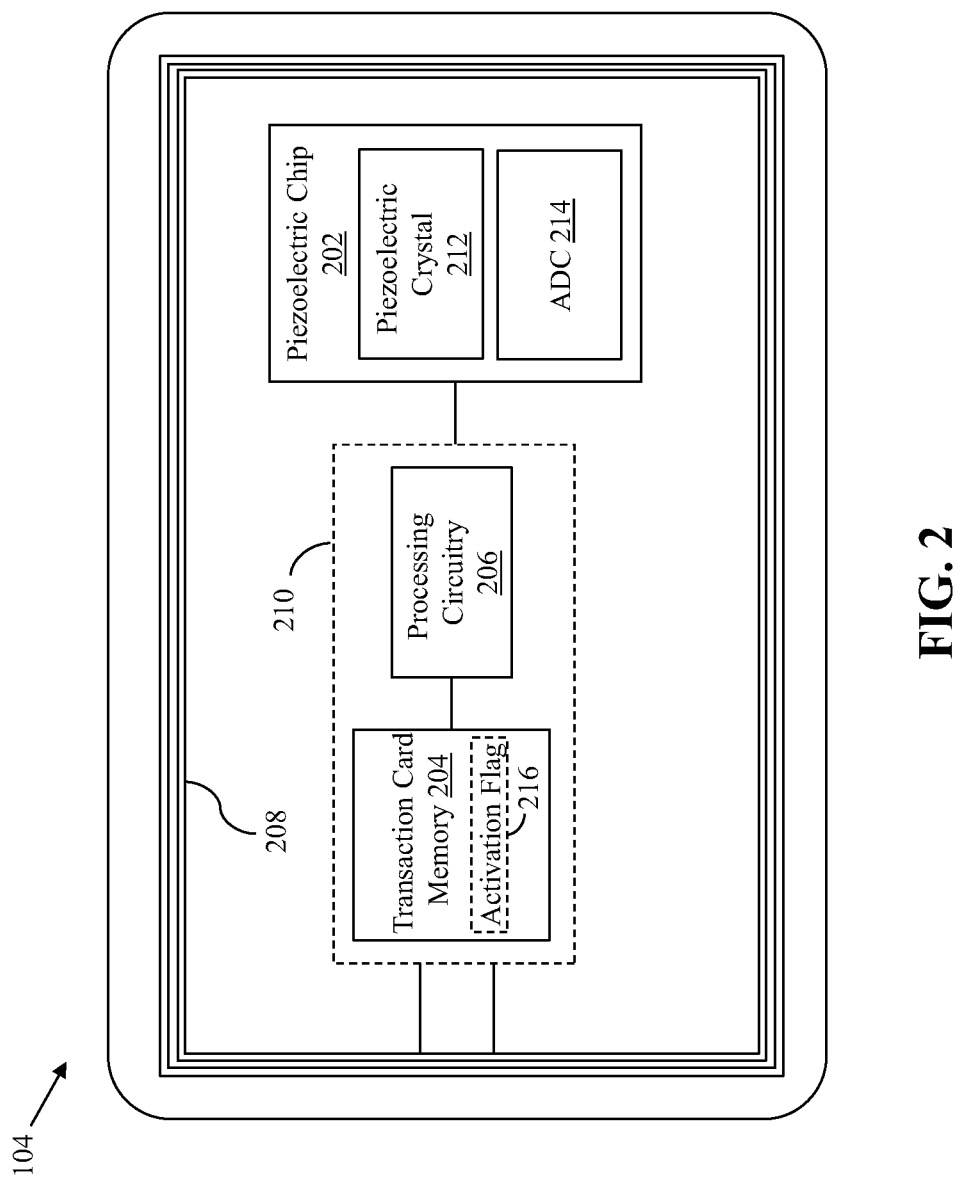
FIG. 2 is a schematic diagram that illustrates a transaction card of FIG. 1 that facilitates secure card-based transactions, in accordance with an exemplary embodiment of the present disclosure.

FIG. 2 is a schematic diagram that illustrates the transaction card 104 that facilitates secure card-based transactions, in accordance with an exemplary embodiment of the present disclosure. The transaction card 104 comprises a piezoelectric chip 202, a transaction card memory 204, processing circuitry 206, and an RF interface 208. The transaction card memory 204 and the processing circuitry 206 may be included in an electronic chip 210 such as a Europay, Mastercard and Visa (EMV) chip. The piezoelectric chip 202 includes a piezoelectric crystal 212 and an analog-to-digital convertor (ADC) 214, and is coupled to the processing circuitry 206. The processing circuitry 206 is communicatively coupled to the transaction card memory 204 and the RF interface 208.

For initiating a contactless transaction using the transaction card 104, the transaction card 104 is required to be powered on. The transaction card 104 is powered by way of the RF interface 208. The RF interface 208 includes suitable logic, circuitry, and/or interface for drawing power from the RF field of the terminal device 106. In other words, when kept within the RF field of the terminal device 106, the RF interface 208 interacts with the RF field and draws power from the terminal device 106. The transaction card 104 gets depowered (i.e., Turned OFF) as soon as the transaction card 104 is removed from the RF field of the terminal device 106. Thus, the transaction card 104 does not require any active power source therein for powering on. Although the transaction card 104 is powered on when kept within the RF field of the terminal device 106, data exchange is initially disabled for the transaction card 104.

The piezoelectric chip 202 includes suitable logic, circuitry, interface, and/or code, executable by the circuitry, to perform one or more operations for enabling the transaction card 104 for data exchange. The piezoelectric chip 202 performs the operations, required for enabling data exchange, using the piezoelectric crystal 212 and the ADC 214.

The piezoelectric crystal 212 is a piezoelectric sensor that exhibits piezoelectric effect when subjected to an impact. The piezoelectric crystal 212 upon detecting the impact produces a potential difference at its opposite ends and generates an electrical pulse signal. In other words, the piezoelectric crystal 212 converts a mechanical stress, a physical deformation, or a kinetic energy, produced by the impact, to the electrical pulse signal. A magnitude of the electrical pulse signal is based on a magnitude of the impact. Thus, higher the impact higher is the magnitude of the electrical pulse signal. For causing the impact on the transaction card 104, the cardholder 102 may press, tap, or shake the transaction card 104 while keeping the transaction card 104 within the RF field of the terminal device 106. Examples of the piezoelectric crystal 212 includes, but are not limited to, quartz, Topaz, Lead Zirconate Titanate, and Barium Titanate.

In one embodiment, the transaction card 104 may have a specified portion or surface where the cardholder 102 is required to provide the impact. For example, the cardholder 102 may be required to provide the impact by pressing the specified portion or surface of the transaction card 104. In another example, the cardholder 102 may be required to tap or press the specified portion of the transaction card 104 against a given surface of the terminal device 106 for providing the impact. In another embodiment, the transaction card 104 may not have any specific portion where the cardholder 102 is required to provide the impact. In such a scenario, the impact may be provided by pressing or tapping anywhere on the transaction card 104 or by shaking or waving the transaction card 104 in any manner.

It will be apparent to a person skilled in the art that providing the impact on the transaction card 104 by tapping, pressing, and shaking is described herein for exemplary purposes and should not be construed to limit the scope of the disclosure. The cardholder 102 may provide the impact by other means that are known in the art for producing mechanical stress or kinetic energy. Although the transaction card 104 is depicted to include the piezoelectric crystal 212, the scope of the transaction card 104 is not limited to it. In other embodiments, the transaction card 104 may include any other material that does not require any active power source for its operation and generates the electrical pulse signal when subjected to the impact.

The ADC 214 is an electronic component which includes suitable logic, circuitry, interface, and/or code, executable by the circuitry, for converting the electrical pulse signal to a digital signal. The ADC 214 converts the electrical pulse signal that is in an analog form to the digital signal which is compatible with the processing circuitry 206. The magnitude of the digital signal may be based on the magnitude of the electrical pulse signal. Therefore, higher the magnitude of the electrical pulse signal higher is the magnitude of the digital signal. In one embodiment, the ADC 214 may be powered by the electrical pulse signal generated by the piezoelectric crystal 212. Alternatively, the ADC 214 may be powered by the RF interface 208 via conductive traces present on surface of the transaction card 104.

In one embodiment, the ADC 214 is a Schmitt Trigger Circuit that converts the electrical pulse signal to the digital signal. The Schmitt Trigger Circuit performs a real time or near-real time conversion of the electrical pulse signal to the digital signal and requires a small magnitude of electric charge (namely, power) for the aforementioned conversion. In other embodiments, the transaction card 104 may include any other ADC 214 that converts the electrical pulse signal to the digital signal without deviating from the scope of the disclosure.

The transaction card memory 204 is a data storage device that includes suitable logic, circuitry, interface, and/or code, executable by the circuitry, for storing the transaction card data. The transaction card data may include the card number, the expiry date, a name of the cardholder 102, the CVV, or the like of the transaction card 104. The transaction card memory 204 is readable by the terminal device 106 when the transaction card 104 is used at the terminal device 106 in a contact-based or contactless manner. An access to the transaction card memory 204 may be controlled by the processing circuitry 206.

The transaction card memory 204 further stores an activation flag 216 that has two states SET and RESET (i.e., a set state and a reset state). When the transaction card 104 is powdered on, the activation flag 216 is initially in the reset state by default. The activation flag 216 may be toggled from the reset state to the set state by the processing circuitry 206 for enabling data exchange for the transaction card 104. The activation flag 216 may be stored in a transient memory location which is volatile and gets wiped out every time the transaction card 104 is depowered. Thus, the state of the activation flag 216 changes to a default state (i.e., the reset state) every time the transaction card 104 is depowered.

The transaction card memory 204 may further store a threshold value. The threshold value may be a numerical value or a signal (having a magnitude) that must be exceeded by one of the generated electrical pulse signal and the digital signal for enabling data exchange for the transaction card 104. In one embodiment, the threshold value is set by the issuer of the transaction card 104. In another embodiment, the threshold value may be a reconfigurable value that can be reconfigured by the issuer or the cardholder 102 with the assistance of the issuer. Examples of the transaction card memory 204 may include, but are not limited to, flash memory and electrically erasable programmable read-only memory (EEPROM).

The processing circuitry 206 includes suitable logic, circuitry, interface, and/or code, executable by the circuitry, for initiating contactless transactions at the terminal device 106. The processing circuitry 206 may be a microprocessor or a microcontroller. Examples of the processing device 502 may include, but are not limited to, an application-specific integrated circuit (ASIC) processor, a reduced instruction set computer (RISC) processor, a complex instruction set computer (CISC) processor, a field programmable gate array (FPGA), or the like. Upon powering on, the processing circuitry 206 may be configured to execute or run an application program stored in the transaction card memory 204. The processing circuitry 206 then checks the state of the activation flag 216. Since the activation flag 216 is in the reset state, the processing circuitry 206 does not allow for any data exchange to occur between the transaction card 104 and the terminal device 106.

Upon powering on, the processing circuitry 206 may further receive one of the electrical pulse signal or the digital signal from the piezoelectric chip 202. The processing circuitry 206 compares the magnitude of the received electrical pulse signal or the received digital signal with the threshold value stored in the transaction card memory 204. When the magnitude of the received electrical pulse signal or the received digital signal exceeds the threshold value, the processing circuitry 206 toggles the activation flag 216, which is in the reset state, to the set state. When the magnitude of the received electrical pulse signal or the received digital signal exceeds the threshold signal or when the activation flag 216 is SET, the processing circuitry 206 enables data exchange between the transaction card 104 and the terminal device 106. The data exchange includes exchange of the transaction card data stored in the transaction card memory 204 and transaction data of the transaction. The transaction data may include additional data required for processing the transaction. Examples of the transaction data may include, but are not limited to, a Personal Identification Number (PIN), a transaction amount, a one-time password (OTP) and the like. The processing circuitry 206 executing or running the application program then causes the terminal device 106 to read the transaction card data from the transaction card memory 204.

In one embodiment, the transaction card 104 may further comprise an antenna that realizes the data exchange, in contactless manner, between the transaction card 104 and the terminal device 106. In one example, the RF interface 208 may serve as the antenna of the transaction card 104 and may facilitate the data exchange. In one embodiment, the data exchange between the transaction card 104 and the terminal device 106 may be governed by one or more communication protocols, for example, ISO/IEC 7816.

It will be apparent to a person of ordinary skill in the art that the transaction card 104 depicted in FIG. 2 is merely an example and should not be construed to limit the scope of the disclosure. In another embodiment, the processing circuitry 206 may be configured to process the electrical pulse signal in the analog format. In such embodiments, the transaction card 104 may not comprise the ADC 214 and the electrical pulse signal generated by the piezoelectric crystal 212 is directly communicated to the processing circuitry 206.

Figure 3A:
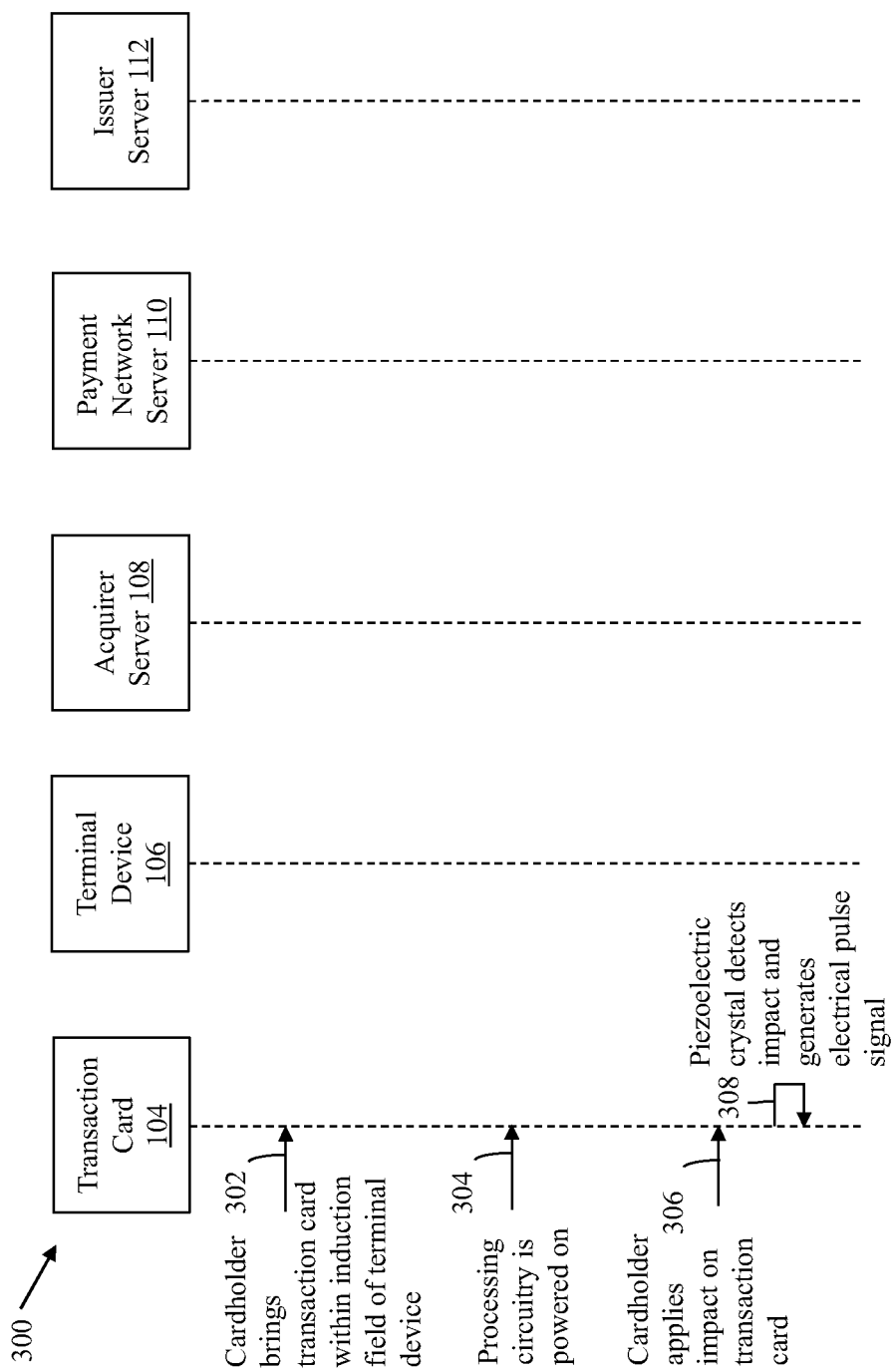
Figure 3C:
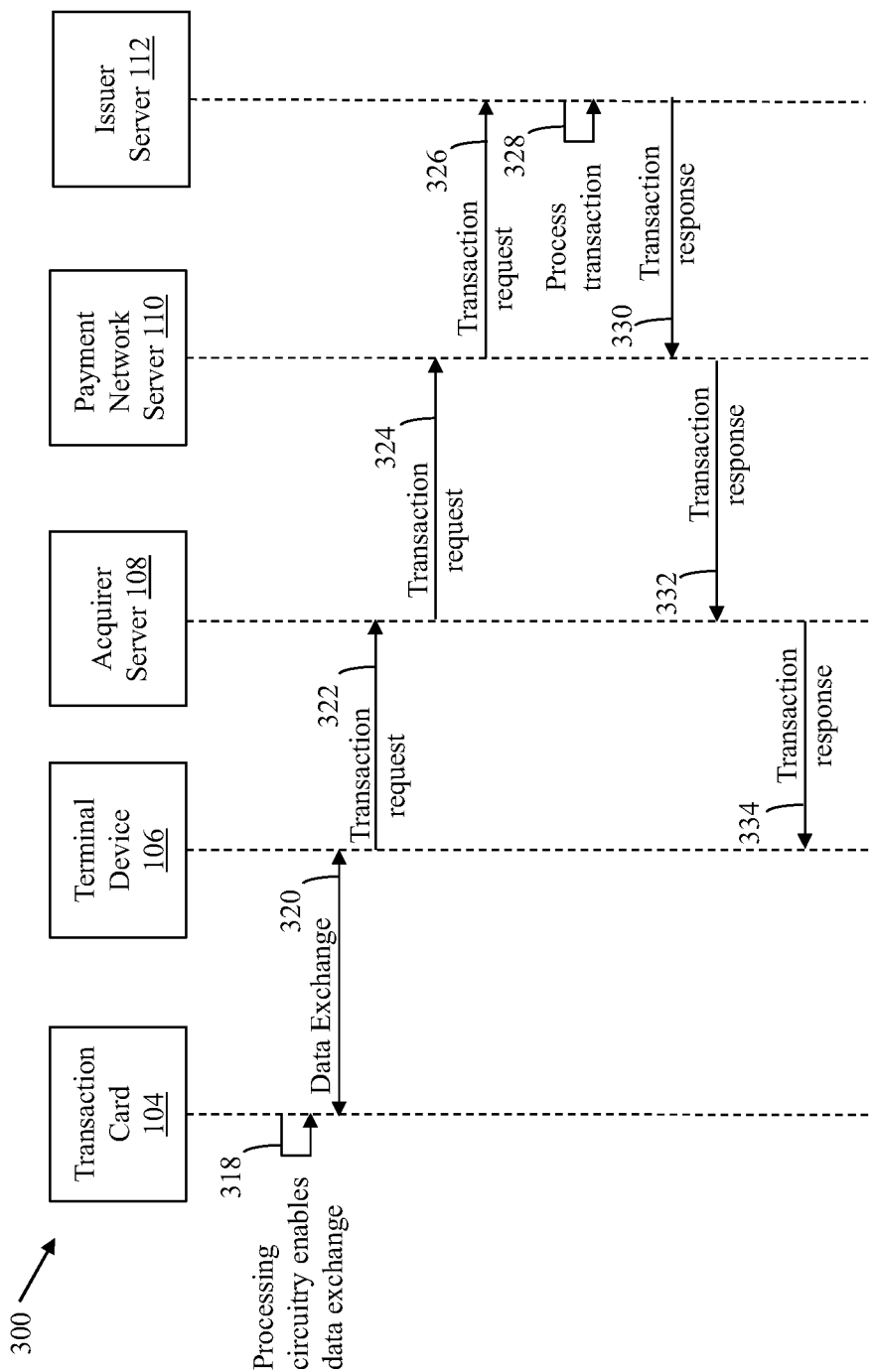

FIGS. 3A, 3B, and 3C, collectively represent a process flow diagram 300 that illustrates an exemplary scenario for facilitating a secure card-based transaction at the terminal device 106 using the transaction card 104, in accordance with an exemplary embodiment of the present disclosure.

The cardholder 102 may want to perform a contactless transaction at the terminal device 106 using the transaction card 104. Therefore, the cardholder 102 brings the transaction card 104 within the RF field of the terminal device 106 (as shown by arrow 302). The RF interface 208, when kept within the RF field, interacts with the RF field and gets energized. The RF interface 208 then powers on the processing circuitry 206 (as shown by arrow 304). In other words, the transaction card 104 is powered on. When the transaction card 104 is powered on, the activation flag 216 is in the default state, i.e., RESET, and data exchange is disabled for the transaction card 104. Thus, the terminal device 106 is unable to read the transaction card data from the transaction card memory 204.

To enable data exchange on the transaction card 104, the cardholder 102 applies (or provides) an impact on the transaction card 104 (as shown by arrow 306) while keeping the transaction card 104 within the RF field of the terminal device 106. The cardholder 102 may apply the impact by tapping, shaking, or pressing the transaction card 104. The piezoelectric crystal 212 detects the impact and generates the electrical pulse signal based on the detected impact (as shown by arrow 308). The magnitude of the electrical pulse signal is proportional to the magnitude of the impact. The ADC 214 receives the electrical pulse signal generated by the piezoelectric crystal 212 and converts the received electrical pulse signal to the digital signal (as shown by arrow 310). The magnitude of the digital signal is based on the magnitude of the electrical pulse signal. The processing circuitry 206 receives the digital signal and accesses the threshold value from the transaction card memory 204 for comparison with the digital signal. The processing circuitry 206 then compares the magnitude of the digital signal with the threshold value (as shown by arrow 312) to determine whether the magnitude of the digital signal exceeds the threshold value. When the magnitude of the digital signal exceeds the threshold value, the processing circuitry 206 toggles the activation flag 216 from the reset state to the set state (as shown by arrow 314). The processing circuitry 206 then checks the state of the activation flag 216 (as shown by arrow 316) residing in the transaction card memory 204. At an instance, when the activation flag 216 is SET, the processing circuitry 206 enables the data exchange between the transaction card 104 and the terminal device 106 (as shown by arrow 318). The transaction card data of the transaction card 104 is then exchanged between the transaction card 104 and the terminal device 106 (as shown by arrow 320) in a manner as known to those of skill in the art.

Further, the data exchange also includes exchange of transaction data of the transaction. The transaction data includes PIN, the transaction amount, and/or the like. The transaction data may be provided by the cardholder 102 via the input buttons or the touch-enabled interface (as depicted in FIG. 4) of the terminal device 106. Upon completion of data exchange, the terminal device 106 generates and communicates a transaction request to the acquirer server 108 for processing the transaction (as shown by arrow 322). The acquirer server 108 receives the transaction request and identifies the payment network server 110 associated with the transaction card 104. Subsequently, the acquirer server 108 communicates the transaction request to the identified payment network server 110 (as shown by arrow 324). The payment network server 110 receives the transaction request and identifies the issuer server 112 responsible for processing the transaction. Subsequently, the payment network server 110 communicates the transaction request to the identified issuer server 112 (as shown by arrow 326). The issuer server 112, based on the transaction card data and the transaction data included in the transaction request, may approve or decline the transaction. When the transaction request is approved, the issuer server 112 processes the transaction (as shown by arrow 328). For example, the issuer server 112 may credit or debit the financial account associated with the transaction card 104 as per the transaction data included in the transaction request. Subsequently, the issuer server 112 generates and communicates a transaction response to the payment network server 110 (as shown by arrow 330). The transaction response is indicative of a result of processing the transaction. Subsequently, the payment network server 110 communicates the received transaction response to the acquirer server 108 (as shown by arrow 332). The acquirer server 108 then communicates the transaction response to the terminal device 106 (as shown by arrow 334). The terminal device 106 displays the transaction response for presenting to the cardholder 102.

In another embodiment, the transaction card 104 may not include the ADC 214. In such a scenario, the electrical pulse signal generated by the piezoelectric crystal 212 is directly communicated to the processing circuitry 206 for comparison with the threshold value.

FIG. 4 is a schematic diagram that illustrates an exemplary scenario 400 for conducting the card-based transaction at the terminal device 106 using the transaction card 104, in accordance with an exemplary embodiment of the present disclosure. The terminal device 106 depicted in FIG. 4 is a POS device. The POS device is an example of the terminal device 106 that is used to process card-based transactions at retail locations, such as a merchant store, a restaurant, or the like, for purchase of goods, services, or the like.

The terminal device 106 comprises the RF field generator (hereinafter, referred to and designated as "the RF field generator 402"), a transaction card reader 404, the touch-enabled interface (hereinafter, referred to and designated as "the touch-enabled interface 406"), and the input buttons (hereinafter, referred to and designated as "the input buttons 408").

The RF field generator 402 includes suitable logic, circuitry, interface, and/or code, executable by the circuitry, for generating the RF field (hereinafter, referred to and designated as "the RF field 410") within a communication range 412 of the terminal device 106. The terminal device 106 may read the transaction card data, using the NFC technology, only when the transaction card 104 is kept within the communication range 412 of the terminal device 106. The transaction card reader 404 includes suitable logic, circuitry, interface, and/or code, executable by the circuitry, for reading the transaction card data in contact-based manner.

When the transaction card 104 is within the communication range 412, the transaction card 104 gets powered on due to an interaction between the RF interface 208 and the RF field 410 present in the communication range 412. Upon powering on, the activation flag 216 of the transaction card 104 is in the reset state, and hence data exchange is disabled for the transaction card 104. The cardholder 102 then provides an impact on the transaction card 104 for enabling data exchange. For example, as depicted in FIG. 4, the cardholder 102, who is holding the transaction card 104 in her hand 414, waves the transaction card 104 in a to and fro motion (as shown by dotted curved arrow) for providing the impact. When the magnitude of the electrical pulse signal, generated by the piezoelectric crystal 212 due to the impact, exceeds the threshold value, the processing circuitry 206 toggles the state of the activation flag 216 from RESET to SET. The activation flag 216 in the set state indicates that data exchange is enabled for the transaction card 104. Hence, the terminal device 106 reads the transaction card data stored in the transaction card memory 204 in a contactless manner. The cardholder 102 may also provide the transaction data via one of the touch-enabled interface 406 and the input buttons 408. Subsequently, the terminal device 106 communicates the transaction request including the transaction card data and the transaction data to the issuer server 112, via the acquirer server 108 and the payment network server 110, for processing the transaction. The issuer server 112 then processes the transaction by approving or declining the transaction. Based on the processing of the transaction, the issuer server 112 updates the financial account associated with the transaction card 104 and communicates the transaction response to the terminal device 106 via the acquirer server 108 and the payment network server 110. The terminal device 106 then displays the transaction response for presenting it to the cardholder 102.

Figure 5:
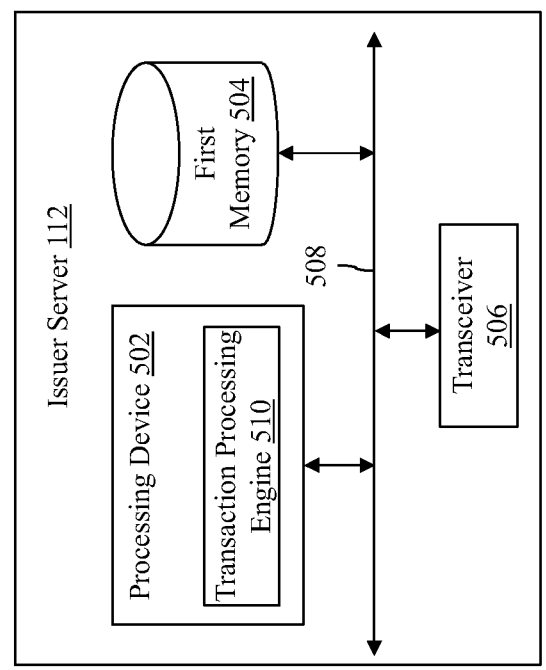
FIG. 5 is a block diagram that illustrates an issuer server of FIG. 1, in accordance with an exemplary embodiment of the present disclosure.

FIG. 5 is a block diagram that illustrates the issuer server 112, in accordance with an exemplary embodiment of the present disclosure. The issuer server 112 may include processing device 502, a first memory 504, and a transceiver 506. The processing device 502, the first memory 504, and the transceiver 506 may communicate with each other by way of a communication bus 508. The processing device 502 may include a transaction processing engine 510.

The processing device 502 includes suitable logic, circuitry, interfaces, and/or code, executed by the circuitry, for processing the transactions performed by way of the transaction card 104. Examples of the processing device 502 may include, but are not limited to, an ASIC processor, a RISC processor, a CISC processor, an FPGA, or the like. The processing device 502 may execute various transaction processing operations by way of the transaction processing engine 510.

The first memory 504 includes suitable logic, circuitry, interfaces, and/or code, executable by the circuitry, to store various instructions for processing the transactions. Examples of the first memory 504 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the first memory 504 in the issuer server 112, as described herein. In another embodiment, the first memory 504 may be realized in form of a database server or a cloud storage working in conjunction with the issuer server 112, without departing from the scope of the disclosure.

The transaction processing engine 510 may process the transaction based on the transaction request received by the issuer server 112. The transaction processing engine 510 may process the transaction by approving or declining the transactions. For processing the transaction, the transaction processing engine 510 may determine whether the financial account linked to the transaction card 104 has sufficient funds to cover the amount of the transaction. In one example, the transaction processing engine 510 may determine that the financial account has sufficient funds to cover the amount of the transaction and approves the transaction. In another example, the transaction processing engine 510 may determine that the financial account has insufficient funds, and decline the transaction. The transaction processing engine 510 may further generate the transaction response to indicate the result of transaction processing.

The transceiver 506 may include suitable logic, circuitry, interfaces, and/or code, executable by the circuitry, to transmit and receive data over the communication network 114 using one or more communication network protocols. The transceiver 506 may transmit messages to and receive messages from the payment network server 110. For example, the transceiver 506 receives the transaction request from the payment network server 110 and transmits the transaction response to the payment network server 110. Examples of the transceiver 506 may include, but are not limited to, an antenna, a radio frequency transceiver, a wireless transceiver, a Bluetooth transceiver, an ethernet port, or any other device configured to transmit and receive data.

Figure 6:
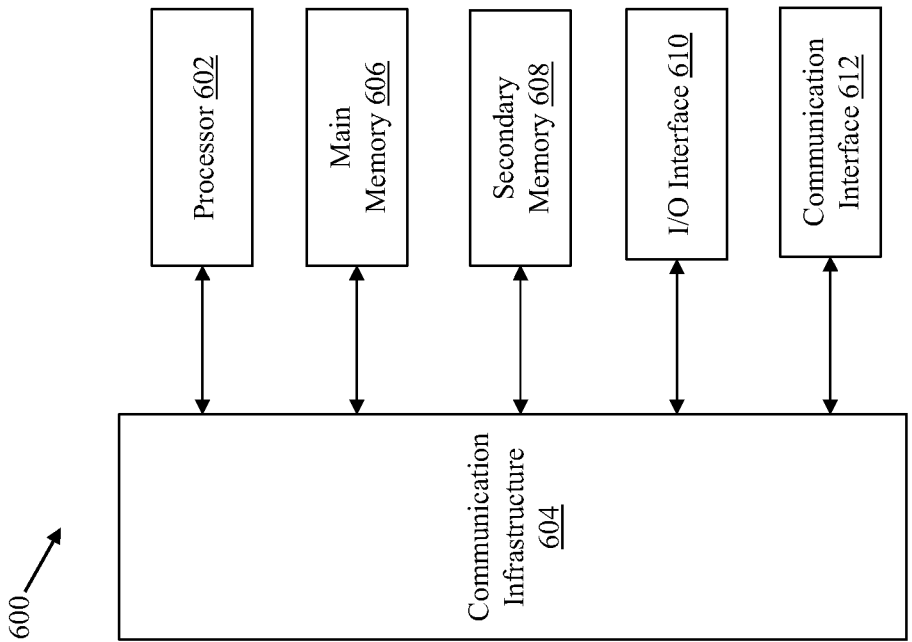
FIG. 6 is a block diagram that illustrates a system architecture of a computer system, in accordance with an exemplary embodiment of the present disclosure.

FIG. 6 is a block diagram that illustrates a system architecture of a computer system 600, in accordance with an embodiment of the present disclosure. In one example, the terminal device 106, the acquirer server 108, the payment network server 110, and the issuer server 112 of FIG. 1 may be implemented as the computer system 600. Hardware, software, or any combination thereof may embody modules and components used to implement the methods of FIGS. 7, 8, 9, and 10.

The computer system 600 includes a processor 602 that may be a special-purpose or a general-purpose processing device. The processor 602 may be a single processor, multiple processors, or combinations thereof. The processor 602 may have one or more processor cores. In one example, the processor 602 is an octa-core processor. Further, the processor 602 may be connected to a communication infrastructure 604, such as a bus, message queue, multi-core message-passing scheme, and the like. The computer system 600 may further include a main memory 606 and a secondary memory 608. Examples of the main memory 606 may include RAM, ROM, and the like. The secondary memory 608 may include an HDD or a removable storage drive, such as a floppy disk drive, a magnetic tape drive, a compact disc, an optical disk drive, a flash memory, and the like.

The computer system 600 further includes an input/output (I/O) interface 610 and a communication interface 612. The I/O interface 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communication port, and the like. Data transferred via the communication interface 612 may correspond to signals, such as electronic, electromagnetic, optical, or other signals as will be apparent to a person skilled in the art.

Figure 7:
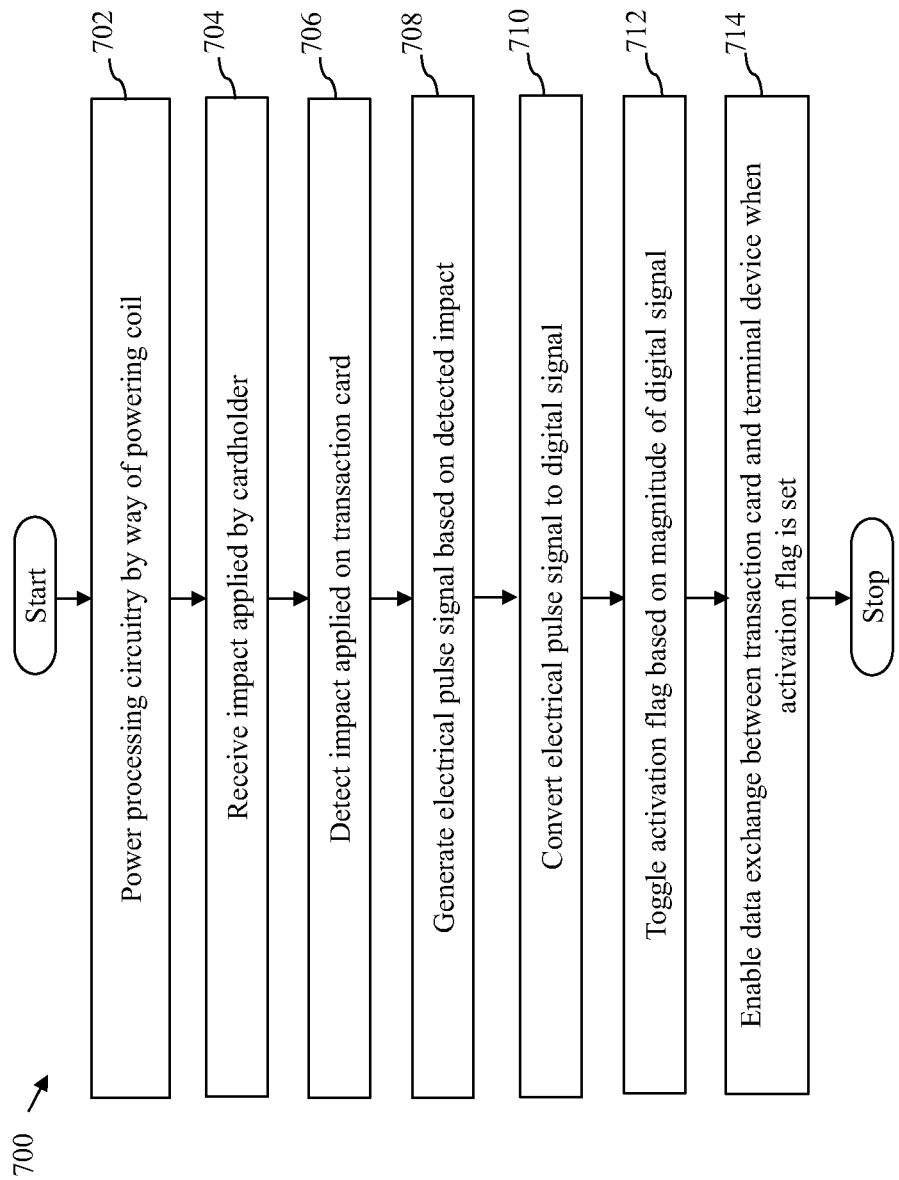
FIG. 7 is a flowchart that illustrates a method for facilitating a secure card-based transaction using the transaction card of FIGS. 1 and 2, in accordance with an exemplary embodiment of the present disclosure.

FIG. 7 is a flowchart 700 that illustrates a method for facilitating a secure card-based transaction using the transaction card 104, in accordance with an exemplary embodiment of the present disclosure.

At step 702, the processing circuitry 206 is powered on by the RF interface 208. For example, when the transaction card 104 is kept within the RF field 410 of the terminal device 106, the RF interface 208 is energized and subsequently powers on the processing circuitry 206. When the processing circuitry 206 is powered on, the activation flag 216 is initially in the reset state indicating that data exchange is disabled for the transaction card 104.

At step 704, the transaction card 104 receives the impact applied by the cardholder 102. The cardholder 102 may cause or provide the impact by tapping the transaction card 104 with the terminal device 106, pressing the transaction card 104 against a specific portion of the terminal device 106, pressing the transaction card 104 with fingers, or shaking the transaction card 104, or the like.

At step 706, the piezoelectric crystal 212 detects the impact applied on the transaction card 104. The piezoelectric chip 202, upon detecting the impact, exhibits piezoelectric effect. At step 708, the piezoelectric chip 202 generates the electrical pulse signal based on the detected impact. The magnitude of the electrical pulse signal is proportional to the magnitude of the impact. The generated the electrical pulse signal is then provided to the ADC 214.

At step 710, the ADC 214 converts the electrical pulse signal to the digital signal. The magnitude of the digital signal is proportional to the magnitude of the electrical pulse signal. At step 712, the processing circuitry 206 toggles the activation flag 216 based on the magnitude of the digital signal. For example, the processing circuitry 206 compares the magnitude of the digital signal with the threshold value and when the magnitude of the digital signal exceeds the threshold value, the processing circuitry 206 toggles the activation flag 216 from the reset state to the set state. At step 714, the processing circuitry 206 enables the data exchange between the transaction card 104 and the terminal device 106 when the activation flag 216 is SET. In other words, the processing circuitry 206 enables data exchange between the transaction card 104 and the terminal device 106 when the magnitude of the digital signal exceeds the threshold value.

FIG. 8 is a flowchart 800 that illustrates a method for facilitating the secure card-based transaction at the terminal device 106, in accordance with an exemplary embodiment of the present disclosure. At step 802, the terminal device 106 reads the transaction card data stored in the transaction card memory 204 of the transaction card 104. The terminal device 106 is able to read the transaction card data when the data exchange between the transaction card 104 and the terminal device 106 is enabled by the processing circuitry 206.

At step 804, the terminal device 106 receives the transaction data of the transaction via the input buttons 408 or the touch-enabled interface 406 of the terminal device 106. At step 806, the terminal device 106 generates the transaction request including the transaction card data of the transaction card 104 and the transaction data of the transaction. At step 808, the terminal device 106 transmits the transaction request to the issuer server 112 via the acquirer server 108 and the payment network server 110 for processing the transaction.

FIG. 9 is a flowchart 900 that illustrates a method for facilitating the secure card-based transaction by the issuer server 112, in accordance with an exemplary embodiment of the present disclosure. At step 902, the issuer server 112 receives the transaction request including the transaction card data and the transaction data. The transaction request is transmitted by the terminal device 106 to the issuer server 112 via the acquirer server 108 and the payment network server 110. At step 904, the issuer server 112 processes the transaction by approving or declining the transaction. At an instance, when the transaction is approved, the issuer server 112 updates the financial account by debiting or crediting the financial account. At step 906, the issuer server 112 then communicates the transaction response to the terminal device 106 via the acquirer server 108 and the payment network server 110. The transaction response may indicate the result of transaction processing.

Figure 10:
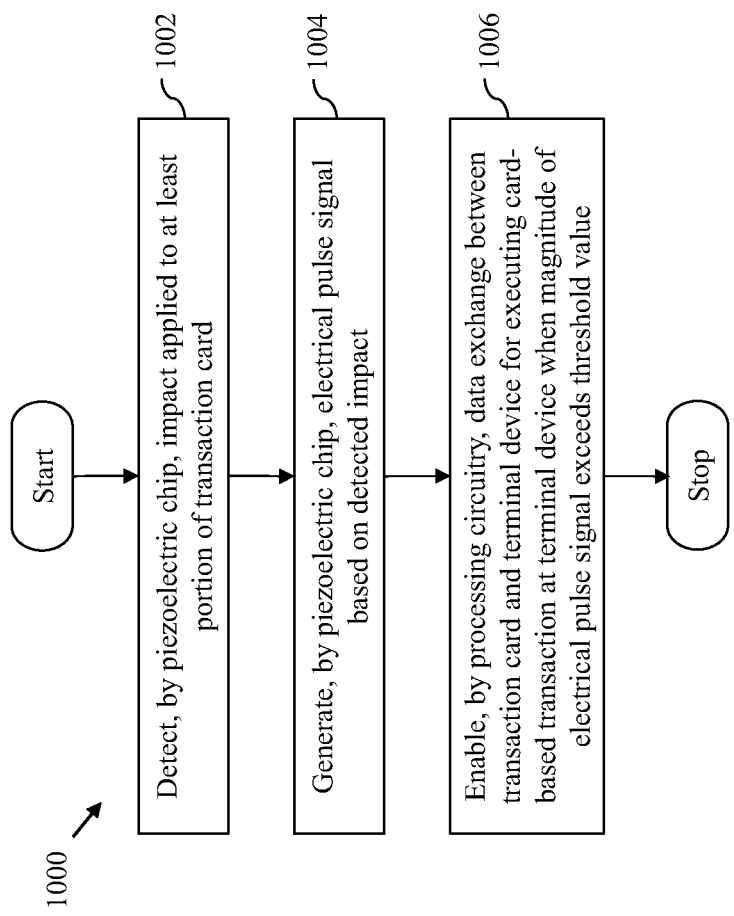
FIG. 10 is a high-level flow chart that illustrates a method for facilitating secure card-based transactions, in accordance with an exemplary embodiment of the present disclosure.

FIG. 10 is a high-level flow chart 1000 that illustrates a method for facilitating secure card-based transactions, in accordance with an exemplary embodiment of the present disclosure. At step 1002, the piezoelectric chip 202 detects the impact applied to the portion of the transaction card 104. At step 1004, the piezoelectric chip 202 generates the electrical pulse signal based on the detected impact. At step 1006, the processing circuitry 206, upon powering on, enables data exchange between the transaction card 104 and the terminal device 106 for executing the card-based transaction at the terminal device 106. The data exchange is enabled when the magnitude of the electrical pulse signal exceeds the threshold value. The data exchange includes exchange of at least one of transaction card data of the transaction card 104 or transaction data of the card-based transaction.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. Further, the operations may be described as a sequential process, however some of the operations may in fact be performed in parallel, concurrently, and/or in a distributed environment by single or multiprocessor machines. In addition, in some embodiments the order of operations may be rearranged without departing from the spirit of the disclosed subject matter.

The transaction card, method, and system disclosed herein provide a secure means for performing contactless card-based transactions. Such card-based transactions are secured by allowing a conditional exchange of transaction card data between the transaction card 104 and the terminal device 106. Therefore, the transaction card data is prevented from getting compromised. In other words, the transaction card 104, when kept within the RF field (e.g., the RF field 410) of the terminal device 106, does not automatically allow transfer of the transaction card data to the terminal device 106. Hence, a malicious device, which is not authorized to perform transactions with the transaction card 104, is unable to receive the transaction card data from the transaction card 104 without an impact, even when the transaction card 104 is kept within an RF field or NFC range of such malicious device. Consequently, the malicious device is prevented from executing an unauthorized contactless transaction using the transaction card 104. The issuer may set the threshold value sufficiently high so as to prevent data exchange due to accidental impacts. Thus, the transaction card data may not be transmitted when the cardholder 102 accidently causes an impact on the transaction card 104 as a magnitude of such unwanted impact may not cause the magnitude of the electrical pulse signal to exceed the threshold value. The requirement of the magnitude of the electrical pulse signal exceeding the threshold value also reduces a likelihood of human error and unintentional data exchange. Further, the transaction card 104 does not require any additional power source for its functioning. Therefore, the transaction card 104 provides seamless and secure solution for performing contactless card-based transactions.

Techniques consistent with the present disclosure provide, among other features, systems and methods for facilitating secure card-based transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A transaction card for facilitating secure card-based transactions, the transaction card comprising:
   a piezoelectric chip configured to:
      detect an impact applied to at least a portion of the transaction card; and
      generate an electrical pulse signal based on the detected impact;
   processing circuitry that is coupled to the piezoelectric chip, wherein the processing circuitry is powered on when present in a radio frequency (RF) field of a terminal device; and
   a transaction card memory that is coupled to the processing circuitry and configured to store an activation flag, a threshold value, and transaction card data of the transaction card, wherein the activation flag is in a reset state upon powering on the processing circuitry, and wherein data exchange is disabled for the transaction card when the activation flag is in the reset state;
   wherein the processing circuitry is configured to:
      compare a magnitude associated with the electrical pulse signal and the stored threshold value;
      toggle the activation flag based on the comparison, wherein the processing circuitry is configured to toggle the activation flag from the reset state to a set state when the magnitude associated with the electrical pulse signal exceeds the stored threshold value; and enable the data exchange for the transaction card when the activation flag is in the set state, comprising enable an exchange between the transaction card and the terminal device for executing a card-based transaction at the terminal device when the activation flag is in the set state, wherein the exchange includes an exchange of at least one of the transaction card data or transaction data of the card-based transaction.

2. The transaction card of claim 1, wherein the processing circuitry is further configured to:
determine the activation flag is in the reset state upon powering on the processing circuitry; and
disable the data exchange for the transaction card based on the determination.

3. The transaction card of claim 1, wherein the piezoelectric chip comprises:
a piezoelectric crystal that detects the impact and generates the electrical pulse signal based on the detected impact; and
an analog to digital convertor (ADC) coupled to the piezoelectric crystal and the processing circuitry, and configured to:
convert the electrical pulse signal to a digital signal, wherein the magnitude associated with the electrical pulse signal comprises a magnitude of the digital signal.

4. The transaction card of claim 3, wherein the ADC is a Schmitt Trigger Circuit.

5. The transaction card of claim 1, further comprising an RF interface that, when present in the RF field of the terminal device, is configured to power on the processing circuitry.

6. A method for facilitating secure card-based transactions, the method comprising:
detecting, by a radio frequency (RF) interface of a transaction card, an RF field of a terminal device;
powering on processing circuitry of the transaction card upon detection of the RF field of the terminal device;
detecting, by a piezoelectric chip on the transaction card, an impact applied to at least a portion of the transaction card;
generating, by the piezoelectric chip, an electrical pulse signal based on the detected impact;
retrieving, from a transaction card memory of the transaction card, an activation flag, a threshold value, and transaction card data of the transaction card, wherein the activation flag is in a reset state upon powering on the processing circuitry, and wherein data exchange is disabled for the transaction card when the activation flag is in the reset state;
comparing, by the processing circuitry, a magnitude associated with the electrical pulse signal and the retrieved threshold value;
toggling, by the processing circuitry, the activation flag based on the comparison, comprising toggling the activation flag from the reset state to a set state when the magnitude associated with the electrical pulse signal exceeds the retrieved threshold value; and
enabling, by the processing circuitry, the data exchange for the transaction card when the activation flag is in the set state, comprising enabling an exchange between the transaction card and the terminal device for executing a card-based transaction at the terminal device when the activation flag is in the set state, wherein the exchange includes an exchange of at least one of the transaction card data or transaction data of the card-based transaction.

7. The method of claim 6, further comprising:
determining, by the processing circuitry, the activation flag is in the reset state;
disabling, by the processing circuitry, the data exchange for the transaction card based on the determination.

8. The method of claim 6, further comprising converting, by an analog to digital convertor (ADC) of the transaction card, the electrical pulse signal to a digital signal, wherein the magnitude associated with the electrical pulse signal comprises a magnitude of the digital signal.

9. The method of claim 8, wherein the ADC is a Schmitt Trigger Circuit.

10. The method of claim 6, further comprising powering on the processing circuitry, by an RF interface of the transaction card, when the transaction card is present in the RF field of the terminal device.

11. A system for facilitating secure card-based transactions, the system comprising:
a transaction card, comprising:
a piezoelectric chip configured to:
detect an impact applied to at least a portion of the transaction card; and
generate an electrical pulse signal based on the detected impact;
processing circuitry that is coupled to the piezoelectric chip, wherein the processing circuitry is powered on when present in a radio frequency (RF) field of a terminal device; and
a transaction card memory that is coupled to the processing circuitry and configured to store an activation flag, a threshold value, and transaction card data of the transaction card, wherein the activation flag is in a reset state upon powering on the processing circuitry, and wherein data exchange is disabled for the transaction card when the activation flag is in the reset state,
wherein the processing circuitry is configured to:
compare a magnitude associated with the electrical pulse signal and the stored threshold value;
toggle the activation flag based on the comparison, wherein the processing circuitry is configured to toggle the activation flag from the reset state to a set state when the magnitude associated with the electrical pulse signal exceeds the stored threshold value; and
enable the data exchange for the transaction card when the activation flag is in the set state, comprising enable an exchange between the transaction card and the terminal device for executing a card-based transaction at the terminal device when the activation flag is in the set state, wherein the exchange includes an exchange of at least the transaction card data or transaction data of the card-based transaction; and
a terminal device configured to:
receive the transaction card data from the transaction card when the data exchange is enabled; and
generate a transaction request for the card-based transaction based on the transaction card data, wherein the card-based transaction is processed based on the transaction request.

12. The system of claim 11, further comprising a server arrangement configured to:

receive the transaction request from the terminal device; and process the card-based transaction based on the transaction request.

13. The system of claim 11, wherein the processing circuitry is further configured to:

determine the activation flag is in the reset state upon powering on the processing circuitry; and disable the data exchange for the transaction card based on the determination.

14. The system of claim 11, wherein the piezoelectric chip comprises:

a piezoelectric crystal that detects the impact and generates the electrical pulse signal based on the detected impact; and an analog to digital convertor (ADC) coupled to the piezoelectric crystal and the processing circuitry, and configured to:

convert the electrical pulse signal to a digital signal, wherein the magnitude associated with the electrical pulse signal comprises a magnitude of the digital signal.

15. The system of claim 14, wherein the ADC is a Schmitt Trigger Circuit.

16. The system of claim 11, wherein the transaction card further comprises an RF interface that, when present in the RF field of the terminal device, is configured to power on the processing circuitry.

17. The system of claim 11, wherein the terminal device comprises an RF field generator that is configured to generate the RF field.

* * * * *